United States Patent [19]
Trotter

[11] Patent Number: 5,862,141
[45] Date of Patent: Jan. 19, 1999

[54] VARIABLE BITRATE RADIO MODEM SYSTEM TO ENHANCE DATA TRANSMISSION AND REDUCE ERROR RATES

[75] Inventor: John Andrew Trotter, Chatham, N.J.

[73] Assignee: Lucent Technologies Inc., Murray Hill, N.J.

[21] Appl. No.: 665,131

[22] Filed: Jun. 14, 1996

[51] Int. Cl.[6] .................................................. H04J 3/22
[52] U.S. Cl. ........................... 370/468; 375/222; 455/557
[58] Field of Search .................................. 370/242, 252, 370/253, 333, 465, 545, 468; 375/220, 222, 225; 371/5.1, 5.2, 5.5; 455/556, 557

[56] References Cited

U.S. PATENT DOCUMENTS

| | | | |
|---|---|---|---|
| 4,309,771 | 1/1982 | Wilkens | 371/5 |
| 4,665,519 | 5/1987 | Kirchner et al. | 375/222 |
| 4,941,144 | 7/1990 | Mizukami | 371/5.5 |
| 5,072,407 | 12/1991 | Gutz et al. | 364/514 |
| 5,105,423 | 4/1992 | Tanaka et al. | 371/5.5 |
| 5,396,516 | 3/1995 | Padovani et al. | 370/465 |
| 5,502,752 | 3/1996 | Averbuch et al. | 370/46 |
| 5,537,410 | 7/1996 | Li | 370/465 |

*Primary Examiner*—Chi H. Pham
*Assistant Examiner*—Ricky Q. Ngo

[57] ABSTRACT

Disclosed is a variable bitrate radio modem unit that includes a transmit section and a receive section that are linked through a host computer. In the transmit section, the host computer is connected to a data modulator equipped with a variable bitrate data generator which in turn is connected to a radio transmit modem. In the receive section, a radio receive modem is connected to a clock/data recovery circuit which in turn is connected to an error detection and correction circuit. The error detection and correction circuit is then connected to the host computer. A connection is established at a predetermined bitrate between two host computers of two individual radio modem units. While data is being transmitted back and forth, the error rate of the data being received is determined by the error detection circuit. If the error rate is larger than a predetermined rate, the bitrate of the radio transmit modem of the transmitting unit is reduced. Conversely, if the error rate is smaller than a second predetermined rate, the bitrate of the radio transmit modem of the transmitting unit is increased.

25 Claims, 4 Drawing Sheets

VARIABLE BITRATE RADIO MODEM SYSTEM TO ENHANCE DATA TRANSMISSION AND REDUCE ERROR RATES

FIELD OF THE INVENTION

This invention relates to modems, and, more particularly, to a radio modem system that provides improved data transmission and reduced error rates by varying the rate at which data is transmitted.

BACKGROUND OF THE INVENTION

Communication links between computer devices are often provided by direct cable connections or by modems that transmit data over telephone lines. Direct cable connections are expensive to install and require that each piece of equipment operate with a common communication protocol. Computer equipment linked through telephone modems also requires a common communication protocol and requires the user to either maintain or pay for the use of the connecting telephone lines.

Radio modems, such as the one described in U.S. Pat. No. 4,665,519 to Kirchner et al., use radio frequency data transmission to provide communication links between computer devices. Such systems are an alternative to direct cable connections and telephone modem systems that avoid the problems associated therewith.

Prior art radio modem systems, however, have their own set of limitations. For instance, data transmitted over radio frequency waves is subject to interference by ambient background noise existing in the transmission medium. As the level of noise in the transmission medium increases, the error rate of the data received by a radio modem increases. Errors in the data received by a radio modem can be detected by transmitting redundant code and then corrected by including still more redundant code. Error detection and correction methods are well known in the art and are described generally in George C. Clark, Jr. and J. Bibb Cain, *Error Correction Coding for Digital Communications*, Plenum Press, 1981. For high error rates, however, it is possible that the error detection and correction will not be sufficient to recover the original data. In such a situation, the whole packet of data will have to be retransmitted. In short, error detection and correction methods increase the number of bits and the amount of time required to transmit a packet of data. Accordingly, it is advantageous to make the error rate as small as possible.

Radio modems can be both stationary and mobile. The further that radio modems are from one another, the lower the signal to noise ratio and thus the greater the error rate of the transmitted signal. Similarly, if the transmitting power of a radio modem is reduced, for instance to conserve power or to reduce interference among closely spaced stationary units, the signal to noise ratio decreases and thus the error rate increases.

Furthermore, a cellular architecture for mobile computing places stationary units in neighboring cells. If the neighboring cells use different frequencies for the transmission of data, there is no problem with interference. Often times, however, stationary units in neighboring cells are allowed to share the same frequency. In such a situation, if the neighboring cells are too close to one another or if the stationary units are transmitting at too high a power, a problem with interference and transmission errors will occur. One solution is to move the cells further apart, but this will result in a decrease in the amount of frequency sharing that can be used in a given area.

SUMMARY OF THE INVENTION

In one aspect, the invention features a communication peripheral to a computer, much like a telephone modem, and allows the computer to communicate over a radio interface to one or more other similarly equipped computers. The preferred variable bitrate radio modem unit includes a transmit and a receive section that are linked through a host computer. The transmit section connects the host computer to a data modulator equipped with a variable bitrate data generator, the speed of which is set by the host computer. The data modulator is connected to a radio transmit modem. In the receive section, a radio receive modem is connected to a data recovery circuit which in turn is connected to an error detection and correction circuit. The error detection and correction circuit is then connected to the host computer. Both the corrected data and the error rate are communicated to the host computer so it knows the quality of the connection.

A connection is preferably established at a predetermined bitrate between two host computers of two individual radio modem units. An initial bitrate is chosen such that the error rate will not be large, thus enabling the computers to exchange information about the quality of the connection as well as allowing them to communicate raw data. While data is being transmitted back and forth, the error rate of the data being received is determined by the error detection circuit. If the error rate is larger than a predetermined rate, the bitrate of the radio transmit modem of the transmitting unit is reduced. Conversely, if the error rate is smaller than a second predetermined rate, the bitrate of the radio transmit modem of the transmitting unit is increased.

Accordingly, preferred embodiments of the present invention dynamically maximize the bitrate without unduly sacrificing transmission quality.

DETAILED DESCRIPTION OF THE PREFERRED EMBODIMENTS

Figure 1:
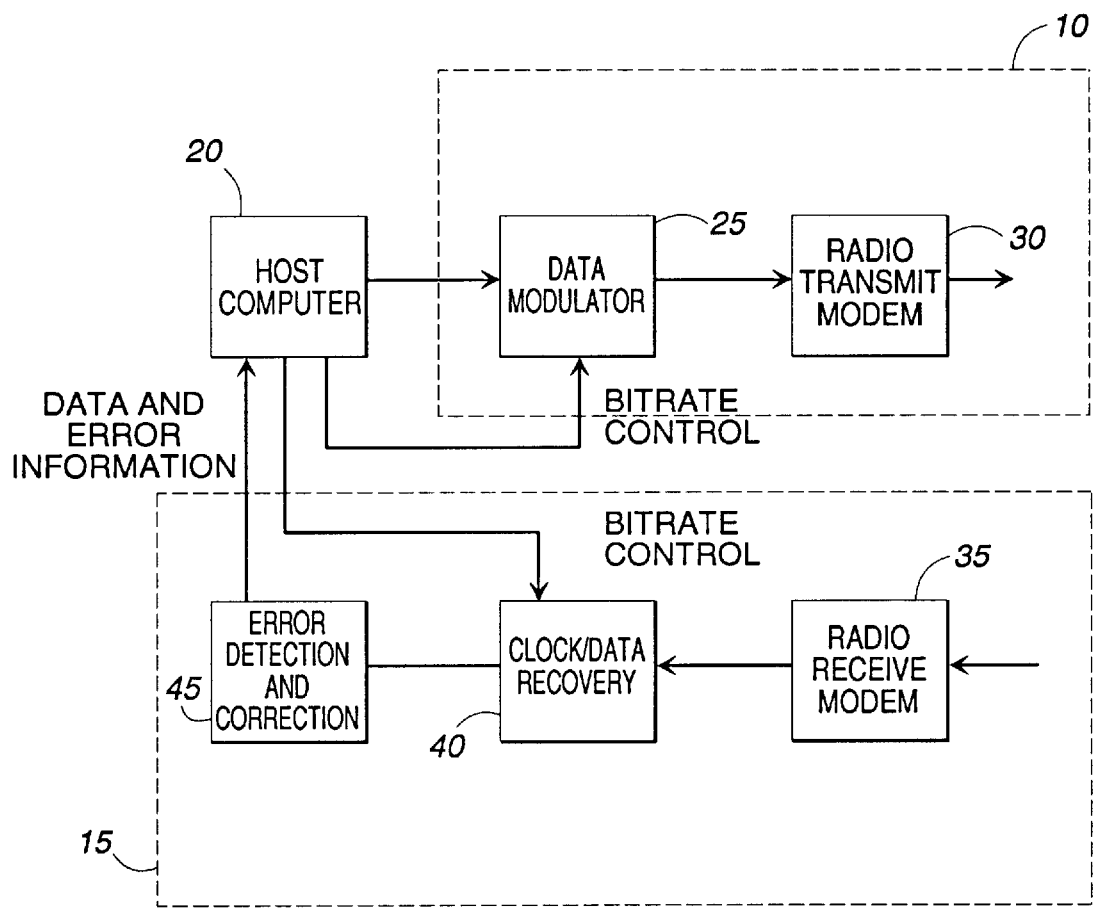
FIG. 1 is a block diagram of an individual variable bitrate radio modem unit in accordance with a preferred embodiment of the invention.

Referring to FIG. 1, a block diagram of an individual variable bitrate radio modem unit is shown. A transmit section 10 and a receive section 15 are linked through a host computer 20. In transmit section 10, a data modulator 25, comprising a variable bitrate data generator, is connected to a radio transmit modem 30. Data modulator 25 is also connected to host computer 20. Host computer 20 sets the speed of the variable bitrate data generator of data modulator 25 as described in detail below.

In receive section 15, a radio receive modem 35 is connected to clock/data recovery circuit 40 for performing clock recovery and pulse synchronization functions on the data received. Clock/data recovery circuit 40 is connected to an error detection and correction circuit 45. Error detection and correction circuit 45 is also connected to host computer 20, as shown. In addition, host computer 20 is connected to clock/data recovery circuit 40. Thus, host computer 20 is able to communicate bitrate control information to both data modulator 25 and clock/data recovery circuit 40.

Figure 2:
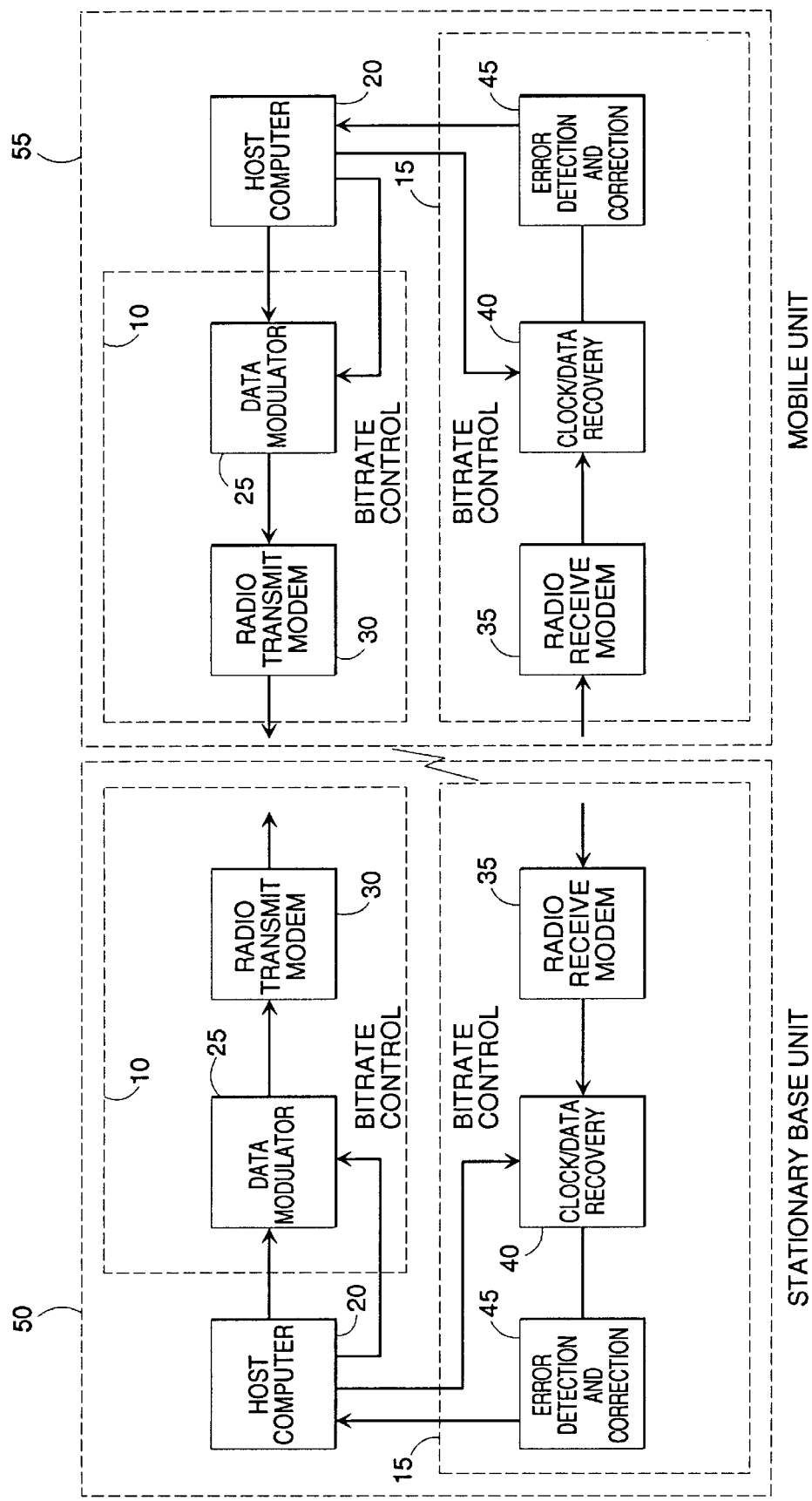
FIG. 2 is a block diagram of two variable bitrate radio modem units, like the one illustrated in FIG. 1, in communication with one another.

Referring to FIG. 2, two variable bitrate radio modem units of the type shown in FIG. 1 are shown. A first modem unit is stationary unit 50 and the other modem unit is mobile unit 55. A communication link is established at a predetermined bitrate between host computer 20 of stationary unit 50 and host computer 20 of mobile unit 55. The initial bitrate is set at a default rate low enough such that the error rate of the transmission of information between stationary unit 50 and mobile unit 55 will not be large.

While the units are exchanging data with one another, the number of erroneous data packets received by mobile unit 50 may increase if, for instance, mobile unit 55 moves into an area that has a large amount of ambient noise or moves far enough away from stationary unit 50 such that the signal to noise ratio of the signal received by mobile unit 55 becomes large. When either of these phenomena occur, error detection and correction circuit 45 of mobile unit 55 begins to detect more errors and sends a signal reflecting this fact to host computer 20 of mobile unit 55.

Host computer 20 of mobile unit 55 then sends a signal to host computer 20 of stationary unit 50 instructing it to reduce the bitrate of the transmission. At the same time, host computer 20 of mobile unit 55 sends a signal to clock/data recovery circuit 40 of mobile unit 55 informing it of the new, reduced bitrate so that both the transmit and receive bitrates match. As a result of reducing the bitrate of the data transmitted by stationary unit 50, the number of errors detected by error detection and correction circuit 45 of mobile unit 55 will decrease.

Conversely, if the error rate of the information received by mobile unit 55 drops below a predetermined lower threshold, error detection and correction circuit 45 of mobile unit 55 will send a signal reflecting this fact to host computer 20 of mobile unit 55. Host computer 20 of mobile unit 55 will in turn send a signal to host computer 20 of stationary unit 50 instructing it to increase its transmitting bitrate. At the same time, host computer 20 of mobile unit 55 sends a signal to clock/data recovery circuit 40 of mobile unit 55 informing it of the new, increased bitrate so that, again, both the transmit and receive bitrates match.

If during the communication session the error rate ever becomes so high such that no valid data is transferred, then host computer 20 of mobile unit 55 sets the bitrate to a low default level in order to reestablish the connection. The data is then retransmitted by stationary unit 50.

For illustrative purposes, the above description of the operation of the present invention has focused only on that portion of the communication session in which stationary unit 50 is transmitting data to mobile unit 55. It should be apparent to one of skill in the art, however, that the operations would apply equally to that portion of the communication session in which mobile unit 55 is transmitting data to stationary unit 50. In such a situation, mobile unit 55 would be receiving and servicing requests to vary the bitrate from stationary unit 50.

The system of the present invention is also capable of operating under conditions in which the bitrates of the two channels are different than and independent of one another. In other words, conditions where the bitrate of data transmitted by a first unit and received by a second unit is different from and independent of the bitrate of data transmitted by the second unit and received by the first unit.

The ability of the system to operate such that the bitrates of the two channels are different is important for several reasons. First, if full duplex communication, where the transmit and receive channels are operating at different frequencies, is used, one channel may be more susceptible to interference than the other channel and will therefore need a lower bitrate setting to achieve an acceptable error rate. The other channel, with less interference, will not need the lower bitrate.

Second, if a stationary unit and a mobile unit are used, as shown in FIG. 2, it is possible that the stationary unit will be able to transmit at a high enough power such that the error rate of data received by the mobile unit will be low. On the other hand, the mobile unit may need to transmit at a lower power to conserve battery power, resulting in a greater error rate of data received by the stationary unit. Thus, the stationary unit can transmit at a higher bitrate than the mobile unit and still achieve an acceptable error rate due to its higher power capabilities.

Finally, one of two communicating units may be susceptible to interference from a third unit because the third unit is located nearby, is transmitting at the same frequency, or both. The second of the two communicating units, on the other hand, may not suffer from the same interference. Thus, the second unit can receive transmissions sent at a higher bitrate than the first unit and still achieve an acceptable error rate.

The operation of the system under the above described conditions is identical to that described with respect to FIG. 2, except that the bitrate is negotiated in two parts. Specifically, using stationary unit 50 and mobile unit 55 of FIG. 2 as an example, stationary unit 50 transmits a packet of data to mobile unit 55 which receives the data, determines the error rate and communicates the error rate to its host computer 20. Host computer 20 of mobile unit 55 then determines the optimal bitrate for transmissions to mobile unit 55 and sends a signal reflecting the optimal bitrate to stationary unit 50. Host computer 20 of stationary unit 50 then sets the bitrate for transmissions to mobile unit 55 accordingly. Separately, the operations just described are performed for transmissions of data from mobile unit 55 to stationary unit 50, the end result being that the bitrate for transmissions from stationary unit 50 to mobile unit 55 will be different from the bitrate for transmissions from mobile unit 55 to stationary unit 50. Also, as conditions and thus error rates change, the bitrates will be varied independent of one another.

Figure 3:
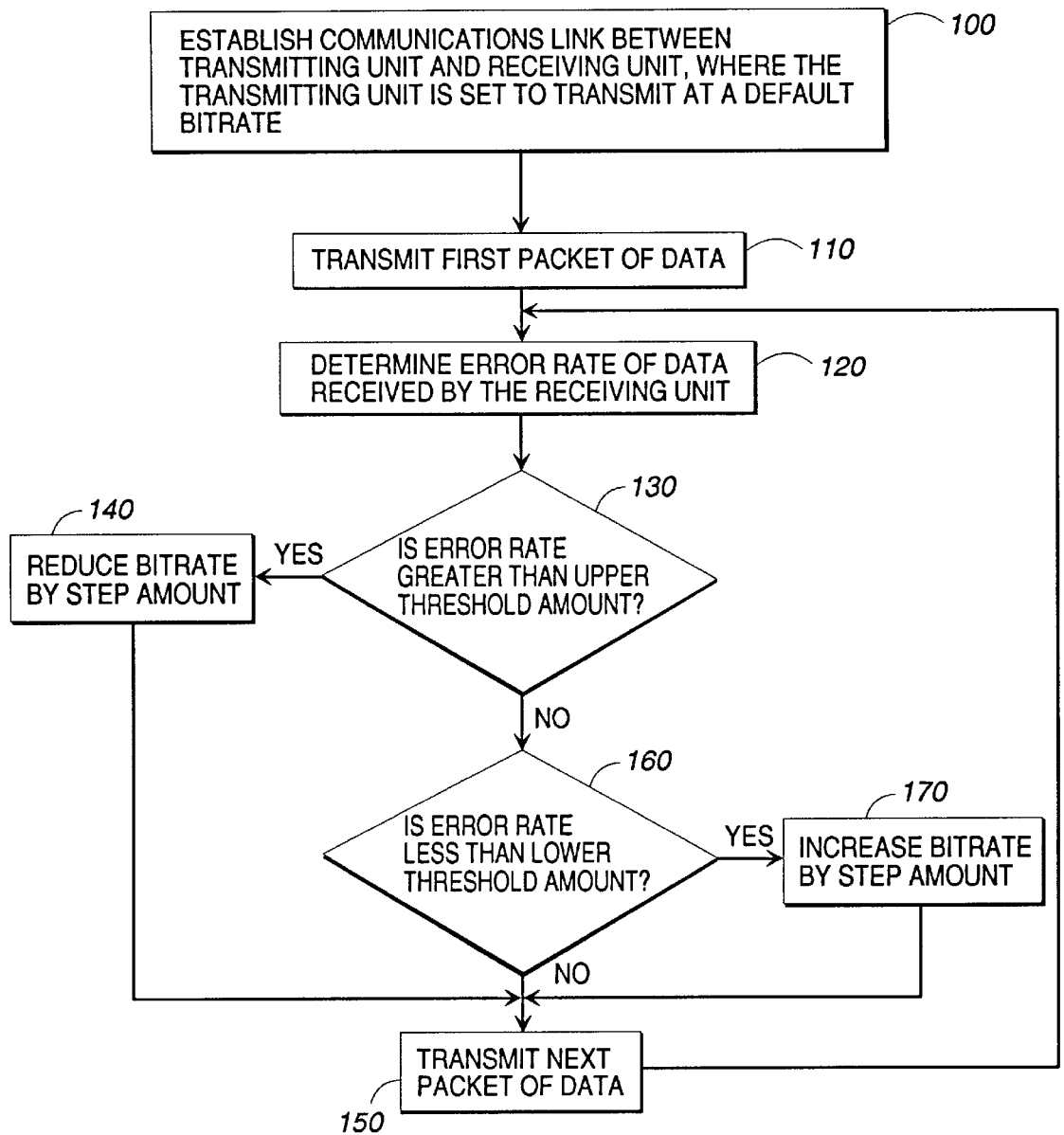
FIG. 3 is a flow diagram of a method of operating the variable bitrate radio modem units shown in FIGS. 1–2.

A preferred method for varying the bitrate of transmissions of data from a transmitting unit of the present invention to a receiving unit of the present invention will now be described in detail with reference to FIG. 3. First, as shown in box 100, a communications link is established between a transmitting unit and a receiving unit. Next, as shown in box 110, the transmitting unit transmits the first packet of data at a default bitrate set low enough such that the initial error rate will not be large. Then, as shown in box 120, the error rate of the data received by the receiving unit is determined. Referring to box 130, a determination is then made as to whether the error rate exceeds a predetermined upper threshold amount. If the error rate exceeds the upper threshold amount, the transmission bitrate is reduced by a step amount as shown in box 140, after which the next packet of data is transmitted as shown in box 150. If the error rate does not exceed the upper threshold amount, a second determination is made as to whether the error rate is less than a predetermined lower threshold, as shown in box 160. If the error rate is less than the lower threshold amount, the error rate is increased by a step amount as shown in box 170, after which the next packet of data is transmitted as shown in box 150.

If the error rate neither exceeds the upper threshold amount nor is less than the lower threshold amount, the next packet of data is transmitted as shown in box 150. In each of the three scenarios just described, after the next packet of data is transmitted as shown in box 150, the process is repeated beginning with box 120. The step amounts of box 140 and box 170 are set by host computer 20.

Figure 4:
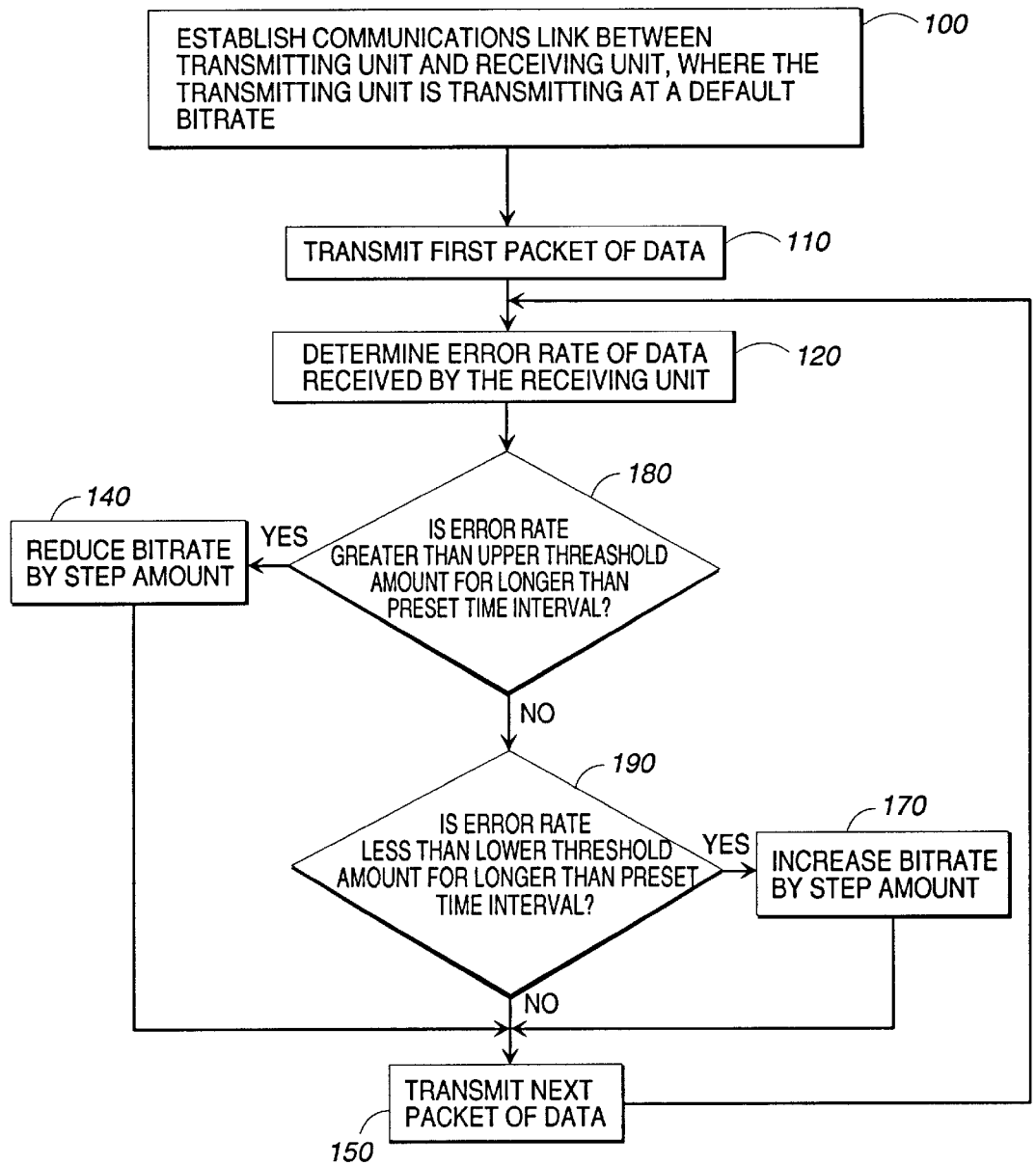
FIG. 4 is a flow diagram of an alternate method of operation of the variable bitrate radio modem.

An alternative method of varying the transmission bitrate of the present invention is shown in FIG. 4. This method differs from the method shown in FIG. 3 only in that the steps shown in boxes 130 and 160 have been replaced with the steps shown in boxes 180 and 190, respectively. Specifically, the method of FIG. 4 differs from the method of FIG. 3 in that at box 180 a determination is made as to whether the error rate exceeds the upper threshold amount for more than a predetermined time interval. Similarly, at box 190, a determination is made as to whether the error rate is less than the lower threshold amount for more than a predetermined time interval. Otherwise, the methods of FIG. 3 and FIG. 4 are identical.

While presently preferred embodiments of the invention have been disclosed, it is to be understood that the invention is not limited thereto but that many modifications will be apparent to those of skill in this art. For example, although one stationary unit and one mobile unit are shown in FIG. 2, the functionality described above applies equally to communication links established between two mobile units or between two stationary units. Other modifications are within the scope of the appended claims.

I claim:

1. A variable bitrate radio modem system, comprising:
   a transmitter for transmitting data at a bitrate to a receiving device;
   a receiver for receiving a bitrate control signal from said receiving device;
   a processor connected to said transmitter for varying said bitrate at which said transmitter transmits data according to said bitrate control signal; and
   a data modulator, within said transmitter and connected to said processor, equipped with a variable bitrate data generator varying said bitrate based on said bitrate control signal.

2. A system according to claim 1, wherein said transmitter comprises a radio transmit modem.

3. A system according to claim 1, wherein said receiver comprises a radio receive modem.

4. A variable bitrate radio modem system, comprising:
   a receiver for receiving data transmitted at a bitrate by a transmitting device;
   an error detection circuit for detecting an error rate of said data received by said receiver;
   a processor for establishing a bitrate control signal based upon said error rate;
   a transmitter for transmitting said bitrate control signal to said transmitting device; and
   a data modulator within said transmitting device equipped with a variable bitrate data generator varying said bitrate based on said bitrate control signal.

5. A system according to claim 4, wherein said receiver receives said data at a first bitrate and said transmitter transmits data at a second bitrate.

6. A system according to claim 5, wherein said first bitrate and said second bitrate are equal.

7. A system according to claim 5, wherein said first bitrate and said second bitrate are different than one another.

8. A system according to claim 4, wherein said receiver comprises a radio receive modem.

9. A system according to claim 4, wherein said transmitter comprises a radio transmit modem.

10. A system according to claim 4, further comprising an error correction circuit.

11. A system according to claim 4, further comprising a clock/data recovery circuit connected to said receiver.

12. A variable bitrate radio modem system, comprising:
    a transmitter transmitting first data and a first bitrate control signal at a first bitrate to a remote device;
    a receiver receiving second data and a second bitrate control signal transmitted by said remote device at a second bitrate;
    a data modulator within said transmitter equipped with a variable bitrate data generator varying said first bitrate based on said second bitrate control signal;
    an error detection circuit within said receiver detecting an error rate of said second data received by said receiver; and
    a processor connected to said variable bitrate data generator and said error detection circuit establishing said first bitrate control signal based upon said error rate.

13. A system according to claim 12, wherein said first bitrate and said second bitrate are different than one another.

14. A system according to claim 12, further comprising an error correction circuit.

15. A system according to claim 12, further comprising a clock/data recovery circuit within said receiver recovering said second data using said first bitrate control signal.

16. A system according to claim 12, wherein said transmitter comprises a radio transmit modem.

17. A system according to claim 12, wherein said receiver comprises a radio receive modem.

18. A method of enhancing the transmission of data from a first radio modem unit to a second radio modem unit, said method comprising the steps of:
    (a) establishing a communications link between said first radio modem unit and said second radio modem unit;
    (b) transmitting a packet of data and a first bitrate control signal from said first radio modem unit to said second radio modem unit at a bitrate set at a predetermined level based on a second bitrate control signal which indicates said bitrate;
    (c) receiving said packet of data and said first bitrate control signal at said second radio modem unit, recovering said packet of data using said second bitrate control signal which indicates said bitrate, and determining an error rate of said packet of data received by said second radio modem unit;
    (d) increasing said bitrate by a predetermined amount if said error rate is greater than a predetermined upper threshold;
    (e) decreasing said bitrate by a predetermined amount if said error rate is less than a predetermined lower threshold;
    (f) transmitting said second bitrate control signal which indicates said bitrate from said second radio modem unit to said first radio modem unit, and transmitting another packet of data from said first radio modem unit to said second radio modem unit at said bitrate; and
    (g) repeating steps c, d, e, and f until all of said data has been transmitted.

19. A method of enhancing the transmission of data from a first radio modem unit to a second radio modem unit, said method comprising the steps of:

(a) establishing a communications link between said first radio modem unit and said second radio modem unit;

(b) transmitting a packet of data and a first bitrate control signal from said first radio modem unit to said second radio modem unit at a bitrate set at a predetermined level based on a second bitrate control signal which indicates said bitrate;

(c) receiving said packet of data and said first bitrate control signal at said second radio modem unit, recovering said packet of data using said second bitrate control signal which indicates said bitrate, and determining an error rate of said packet of data received by said second radio modem unit;

(d) increasing said bitrate by a predetermined amount if said error rate is greater than a predetermined upper threshold for longer than a predetermined time interval;

(e) decreasing said bitrate by a predetermined amount if said error rate is less than a predetermined lower threshold for longer than a predetermined time interval;

(f) transmitting said second bitrate control signal which indicates said bitrate from said second radio modem unit to said first radio modem unit, and transmitting another packet of data from said first radio modem unit to said second radio modem unit at said bitrate; and (g) repeating steps c, d, e, and f until all of said data has been transmitted.

20. A variable bitrate radio modem system, comprising:

a transmitter which transmits first data and a first bitrate control signal at a first bitrate to a remote device;

a data modulator within said transmitter equipped with a variable bitrate data generator which varies said first bitrate based on a second bitrate control signal;

a receiver which (i) receives second data and said second bitrate control signal from said remote device, (ii) determines an error rate based on said second data, and (iii) generates an error rate signal based on said error rate;

a clock/data recovery circuit within said receiver which recovers said second data using said first bitrate control signal; and a processor coupled to said transmitter and to said receiver which generates said first bitrate control signal based on said error rate signal.

21. A system according to claim 20, further comprising:

a radio transmit modem within said transmitter.

22. A system according to claim 20, further comprising:

a radio receive modem within said receiver.

23. A system according to claim 20, further comprising:

an error detection and correction circuit within said receiver which determines said error rate of said second data.

24. A system according to claim 20, wherein said first bitrate and said second bitrate are equal.

25. A system according to claim 20, wherein said first bitrate and said second bitrate are different than one another.

* * * * *